(12) United States Patent
Gill et al.

(10) Patent No.: US 7,133,191 B2
(45) Date of Patent: Nov. 7, 2006

(54) OPTICAL EQUALIZATION

(75) Inventors: Douglas M. Gill, South Orange, NJ (US); Xiang Liu, Marlboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 113 days.

(21) Appl. No.: 11/025,436

(22) Filed: Dec. 29, 2004

(65) Prior Publication Data

US 2006/0139737 A1 Jun. 29, 2006

(51) Int. Cl.
G02F 1/365 (2006.01)
G02B 6/26 (2006.01)

(52) U.S. Cl. .......................... 359/326; 385/15; 385/27; 385/122; 398/158

(58) Field of Classification Search .................. 385/15, 385/27, 39, 122; 398/158–161; 359/326, 359/332
See application file for complete search history.

(56) References Cited

U.S. PATENT DOCUMENTS

| 6,785,446 | B1 * | 8/2004 | Chandrasekhar et al. | ..... 385/39 |
| 6,804,434 | B1 * | 10/2004 | Chandrasekhar et al. | ..... 385/27 |
| 2005/0058459 | A1 * | 3/2005 | Chandrasekhar et al. | ... 398/161 |

OTHER PUBLICATIONS

Kaminow, I. and Koch, T. (Eds.). Optical Fiber Telecommunications IIIB, 1997, Academic, NY, Ch. 8 pp. 345-351, Ch. 9 pp. 388-404.

* cited by examiner

*Primary Examiner*—John D. Lee

(57) ABSTRACT

A device and method for processing a signal e.g. equalizing a signal, is disclosed. Such processing involves dividing a signal into two portions that each traverses a wavepath and then are combined. The respective wavepaths impose a non-linear frequency-versus-phase dependency on a signal portion. The frequency-versus-phase dependencies that characterize the respective wavepaths are similar in shape but inverted from each other. A processed signal has significantly improved signal-to-noise ratio.

11 Claims, 5 Drawing Sheets

OPTICAL EQUALIZATION

TECHNICAL FIELD

This invention relates to optical communication and in particular to equalization of optical signals.

BACKGROUND OF THE INVENTION

Optical communication typically involves the transmission of light e.g. laser light in the wavelength range 800 nm to 1600 nm, over an optical pathway generally including optical fiber and suitable active and passive processing devices such as filters, amplifiers, cross connects, add-drop modules, and dispersion compensation units. A variety of protocols are employed to standardize the form of an optical signal. In a typical protocol, the signal is broken into time slots of between 1000 and 25 picoseconds. A digital 0 is represented by the substantial absence of detectable light during the time slot while a digital 1 corresponds to the presence of such light. Thus, as shown in FIG. 1 an exemplary signal might have the form shown with the corresponding digital signal above the light signal. Although the signal upon insertion into the optical system generally has a square wave pattern as demonstrated in FIG. 1 at 12, this pattern is corrupted both by traversal of the optical fiber and by interaction with the various active and passive devices in the optical system. Thus after such traversal the signal might have degraded as shown by the dotted waveform 10 in FIG. 1. Clearly, if this process continues the signal to noise ratio of the signal degrades and it will not be extractable from the surrounding noise. Thus, it is desirable to periodically reconstitute the wave shape and to amplify this reconstituted wave shape so that the original signal form as inserted in the system is replicated. The process of reshaping the waveform is generally denominated equalization.

In the equalization process not only is the shape of the waveform a concern, but also the nature of transmission on the carrier is also a significant concern. For example, as shown in FIG. 2 the waveform 36 in FIG. 1 is magnified in FIG. 2 to show the underlying carrier light 35. Thus the sine wave associated with electromagnetic carrier frequency of the signal has a specific perceived wavelength as shown in FIG. 2 across the profile of each pulse of light forming the optical signal. The perceived wavelength is the result of the summation of the frequency components that make up the pulse. As injected the perceived wavelength/carrier of this underlying carrier is typically constant throughout the pulse. However, the various distortions imposed on the signal also frequently cause this perceived carrier frequency to become non-constant. Thus as shown in FIG. 3, the distorted signal 36 for some forms of distortion has an underlying carrier with a varying perceived frequency e.g. the perceived frequency of the carrier 25 decreases (and thus the wavelength increases) starting in region 37 and continuing through region 38. This variation in the frequency of the underlying character is generally termed chirp. For many applications, e.g. ultra long haul transmission, signal chirp should be controlled for improved performance.

Thus to equalize the signal it is desirable to return it to its original shape, e.g. a square wave, and it is often desirable to either carefully control, or remove any chirp present. If no chirp is present avoiding the introduction of chirp during the equalization process is often desirable. These goals for equalization are complicated by the numerous systems presently employed for optical communication. For example, many systems use different time slot lengths. That is, the repetition rate (i.e. the bit rate) is generally lower in older systems relative to newer systems. For example, many systems that have been deployed for many years have a 2.5 Gb/s bit rate compared to many current systems having a 10 Gb/s or 40 Gb/s repetition rate. Additionally, many optical fiber pathways are subjected to signals of different repetition rates. It is therefore advantageous for a device designed to equalize a signal having one repetition rate not to produce an unacceptable affect on a signal with a different repetition rate. It is further desirable for the device to be tunable to allow flexibility in application.

The most common approach for equalization involves a two-stage device such as shown in FIG. 4. In this device, an incoming distorted wave is injected into waveguide 42. A small fraction (generally between 0.1 and 15 power percent) is diverted into waveguide 43 and delayed relative to the signal on wavepath 42 until it is then again injected at 44. In one circumstance, if the delay time is chosen appropriately, the two waveforms (one 47 on wavepath 43 and one 49 on wavepath 42) interact constructively as shown in FIG. 5. The combined pulse shown by dotted line 56 continues on wavepath 48 and a second small portion (typically 0.1 to 25 power percent) is diverted into wavepath 42. This diverted portion is advanced relative to that in wavepath 48 so that the two pulses combined at 46 interact constructively as shown in FIG. 6 to give the resultant curve shown by dotted line 50.

In this manner, the waveform is equalized acceptably. However, the wavepaths 48 and 43 used to provide the necessary time delays are relatively large constructs typically including between 1 and 20 centimeters of a monolithic optical waveguide as the delay path length. Thus such devices are relatively large. Additionally, the devices are constructed to process signals of a single repetition rate. That is, the time delays are established for a specific repetition rate to provide constructive (or destructive) interference at 44 and at 46 in FIG. 4. A signal having a different repetition rate requires a different delay time to provide appropriate interference. Thus such equalization devices unacceptably distort signals having a repetition rate significantly different from those intended to be processed. Finally, as discussed, such devices are fabricated for a specific repetition rate and are not adjustable for other repetition rates.

Thus it would be desirable to have an equalization device that is relatively compact, does not adversely affect signals deviating from those for which the device is configured, and which is tunable to equalize signals having different characteristics such as different repetition rates.

SUMMARY OF THE INVENTION

By use of a symmetric device such as a Mach-Zehnder Interferometer (MZI) it is possible to produce a relatively compact equalizer that does not unacceptably distort signals of a lower bit rate or of a lower bandwidth from the signal configuration being processed and which is tunable for a variety of signal characteristics. In particular, the signal being processed, e.g. the signal shown in FIG. 1, is representable as a composite, i.e. sum, of a spectrum of frequencies. Thus, in one embodiment, the signal is representable as a linear combination of sine waves and cosine waves having a continuum of frequencies centered around the carrier frequency. For example, the power-versus-frequency representation of the distorted waveform shown at 10 of FIG. 1 is illustrated in FIG. 8. In this frequency representation, equalization involves modifying the waveform to a shape generally approximating that shown at 81 of FIG. 8. The extent of equalization appropriate to achieve a desired signal quality is system dependent. For example, in a transmission system in which the optical equalization is distributed along the transmission link an adequate amount of equalization is typically around 1 dB improvement in required optical signal-to-noise ratio (OSNR). In comparison in a system in which equalization is localized (not distributed) adequate equalization is exemplified by a 3 dB improvement. Additionally, an acceptable bit error rate (BER) is application dependent and can range from a value of $10^{-15}$ for traditional submarine applications, to $6\times10^{-5}$ for transmission links that employ standard forward error correction algorithms, to a required BER threshold as low as $2\times10^{-3}$ when more aggressive forward error correction is used. Thus equalization that supports a BER of at least $1\times10^{-3}$, preferably $6\times10^{-5}$, most preferably $10^{-15}$ is generally appropriate.

This equalization result is achieved by employing a device such as a MZI where paths (71 and 72 in FIG. 7) introduce nonlinear changes of similar but inverse symmetry in the frequency-versus-phase relation of the signal. The relative position of this nonlinear change in frequency-versus-phase space for the two paths determines the degree of equalization. For example, as shown in FIG. 9, if path 71 introduces a change shown by curve 91 and if path 72 introduces a change shown by curve 92, when the signals on each leg are combined at 73 (FIG. 7) there will be constructive interference at the frequency corresponding to point 93 and destructive interference at the frequency corresponding to point 94. The resulting change in waveform 83 shown in FIG. 8 is shown in FIG. 9 at 96. In contrast, if wavepath 71 and 72 introduce changes 101 and 102 in FIG. 10, then constructive interference occurs at frequency 104 and destructive interference occurs at frequency 105 yielding an equalized waveform 107.

Additionally, when higher repetition rate signals are being processed, there is a relatively small effect on lower repetition rate signals. The lower frequency spectrum, 108, for signals on the system having lower repetition rates are closely centered around the center frequency e.g. 105 in FIG. 10 and thus do not extend beyond the relatively flat portions of curves 101 and 102. Thus, the effect of the nonlinear changes of the MZI device is relatively small on the lower repetition rate signal relative to the higher repetition spectrum 109.

By tuning the shape of the frequency-versus-phase response for both wavepaths and their relative position, great flexibility in equalizing a variety of signals is available. Such tuning is accomplished by modifying the group delay response in each arm of the device. (The group delay is defined as the rate of change of the total phase shift of a signal with respect to angular frequency, $d\theta/d\omega$, through a device or transmission medium, where $\theta$ is the total phase shift, and $\omega$ is the angular frequency equal to $2\pi f$, where $f$ is the frequency of the signal. In essence the group delay is indicative of the effect the transmission medium has on the phase as a function of wavelength over and above the effect propagation through a vacuum would have.) This tuning flexibility not only allows excellent equalization, but provides an expedient for maintaining a signal that is chirp free or for eliminating chirp by an appropriate adjustment of the frequency dependent phase change introduced by each wavepath of the device. Additionally, such devices are relatively compact. Therefore, by use of the invention, a compact component produces excellent equalization without distorting signals of different configuration relative to that being processed.

DETAILED DESCRIPTION

As discussed, the invention involves the equalization of a signal using a device e.g. a MZI having two pathways each of which changes the frequency-versus-phase dependency of the portion of the signal traversing such pathway nonlinearly. Such a non-linear dependency is characterized by a change in the signal group delay traversing the path of magnitude exceeding:

$\pm 200$ BR$^{-2}$ ps/GHz, or $\pm 2.5\times 10^4$ BR$^{-2}$ ps/nm.

for at least one wavelength within the wavelength bandwidth of the channel that is to be equalized, where BR is a non-dimensional number defined by the symbol transmission rate divided by $10^9$ symbols/sec. (The symbol transmission rate includes any transmission overhead allocated to forward error correction or performance monitoring purposes). For example, if a signal bit rate of about 160 Gb/s is equalized with a frequency-versus-phase modification in each arm of the MZI that is quadratic in nature (resulting in a linear change in group delay) a group delay change greater than or equal to ~0.008 ps/GHz (or 1 ps/nm) in one arm of the MZI and less than or equal to −0.008 ps/GHz in the other arm is appropriate. The presence solely of a constant group delay does not lead to advantageous equalization. It is also generally preferred for the frequency-versus-phase dependency (FPD) of the signal in the MZI path to have a minimum or inflection point within (0.5 GHz)×BR of the center frequency of the signal. (A minimum or inflection point, collectively a flat region, for purposes of this invention description is a region spanning at least 2 GHz in frequency where the change in phase is less than 30 degrees in this region. The center frequency of the signal is defined as the center of the channel bandwidth. The channel bandwidth is the wavelength range in which 90 percent of the transmission power associated with a stream of information is found.)

Figure 11:
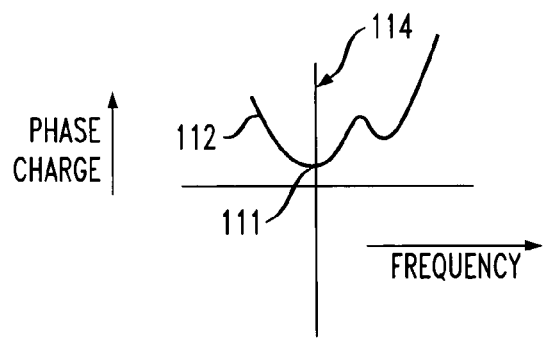

Shown in the example of FIG. 11, an exemplary FPD is represented by a third order polynomial (indicated by graph 112) that has a mixture of odd and even function content, with a flat region of the polynomial 111 overlying the center frequency represented by axis 114. Since a flat region is in the neighborhood of the center frequency, the device has a much smaller effect on signals with lower repetition rate. Thus the ability to process signals of higher repetition rate is maintained without unacceptably affecting signals of lower repetition rate.

Additionally, the effect of the second wavepath on the portion of the signal traversing such path should advantageously have a similar relation to that of the first path but should be a symmetric inverse in phase for chirp free operation. In the context of this invention, for two effects (one in each arm of the device) to be considered similar and a symmetric inverse the FPD relation defining such first effect associated with the first wavepath and such second effect associated with the second wavepath should satisfy a specific relation. In particular the summation of the optical phase impact from each wavepath of the equalizer, appropriately weighted by the relative optical power output by each interferometer arm, results in a peak-to-peak phase ripple of less than 0.30 radians due to the transmission of the signal through the device.

An appropriate weighting for the optical phase shift is achieved by a suitable check of the coupling ratio in the input and output of the device couplers. Such weighting is considered if something other than 50/50 couplers are used for the input and output couplers of the device or if the two arms of the device impart different optical loss. For example, if a 25/75 optical power coupler is used, and the two arms of the device have similar losses, the appropriate weighting of the relative phase shifts in the two arms of the device are such that the device arm with 25% of the power contributed to the output coupler will require a three times larger phase shift than the device arm with 75% of the power contribution to the output coupler. That is, the device arm that contributes ¼ of the optical power to the output coupler requires three times the relative phase shift as compared to the device arm that contributes ¾ of the power. Therefore, it is possible to counteract the imbalance in the coupler by applying an appropriately imbalanced relative phase shift to the two arms of the device to achieve relatively chirp free operation from the equalizer. A suitable imbalance in the phase shift is inversely proportional to the power imbalance in the couplers.

Figure 13:
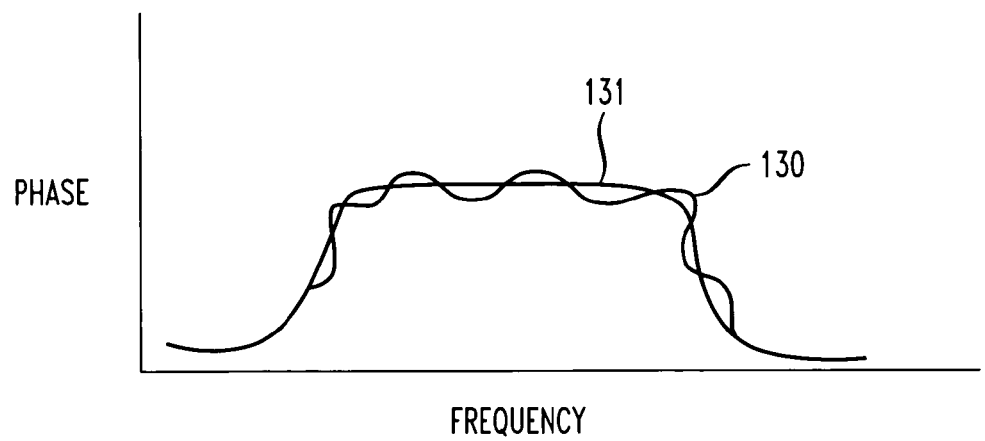

Generally, the desired FPD is in one embodiment produced using ring resonators in each arm of the symmetric device. Each such ring resonator is tunable to produce a specific periodic cyclic function. The periodic cyclic function from each resonator is combined to form the desired FPD. Nevertheless, the combination is not a perfect match to the desired FPD response. Additionally, distortions are generally introduced in the signal by various components that it traverses. As a result, the output from the symmetric device used for equalization generally has a ripple. Such ripple e.g. as shown at 130 in FIG. 13 is a distortion of the desired component response 131.

Figure 14:
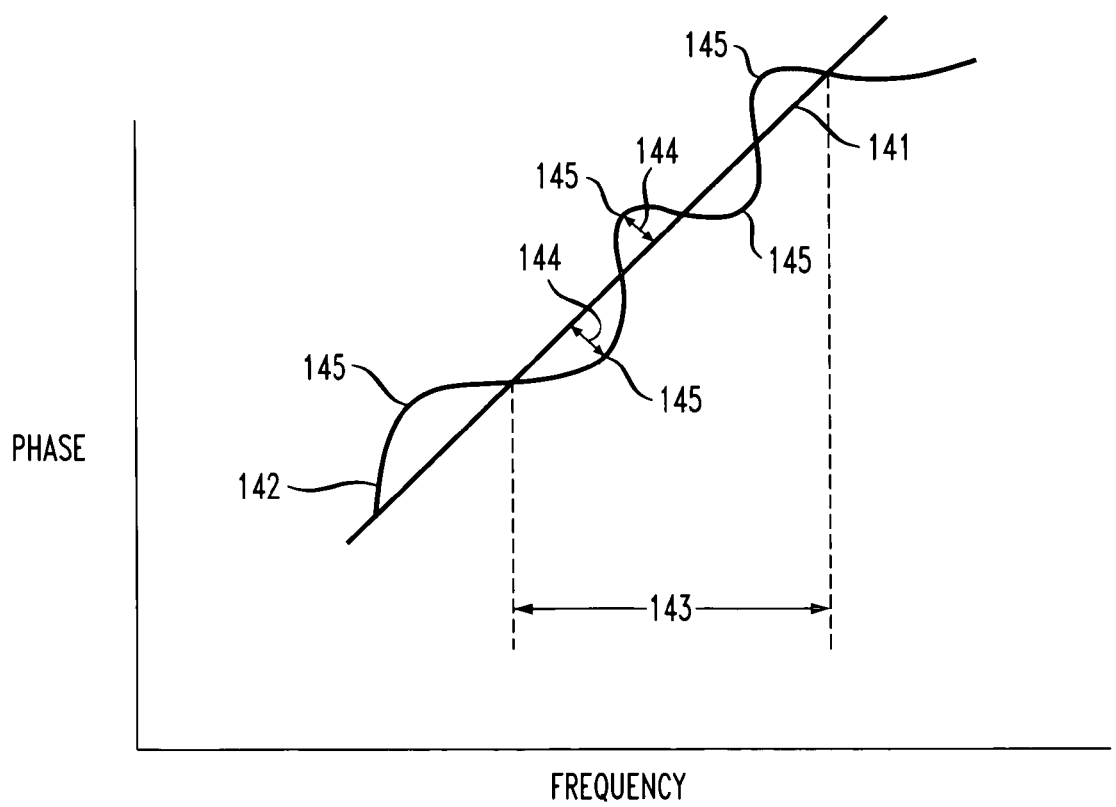

To determine whether there is a phase ripple that deviates from the ideal response less than 0.15 radians (0.3 radians peak-to-peak), a relatively simple control sampling is performed. Light is used from a CW laser having a line width that is at least 10 times narrower than the period of the ripple to be measured. Typically it is more than sufficient to employ a CW laser with a 10 MHz line width that is tuned so that the frequency versus intensity curve can be normalized within 5 percent across the wavelength of the communication channel of interest. This light is injected into the equalizer and the frequency-versus-phase output is measured such as by using an optical vector analyzer. An exemplary result is shown in FIG. 14 where 141 indicates the ideal response and curve 142 is the measured response. The ripple for each channel is measured by examining the curve 142 in the channel frequency range 143. The excursion 144 in each extremum 145 in this range is measured perpendicular to the ideal response 141 to the extremum point. The average of these measurements across the center 75 percent of a channel is used to determine whether the phase ripple is less than 0.15 radians (0.3 peak-to-peak) for that channel.

Figure 10:
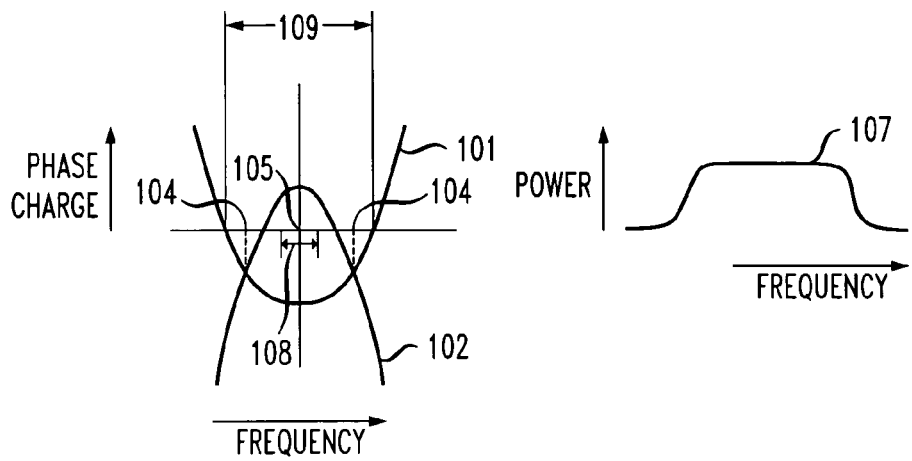

Additionally, the relationship defining the effect of each wavepath should produce constructive interference at frequencies that should be maintained for equalization and destructive interference for frequencies that should be diminished for equalization. Thus, as shown in FIG. 10, the frequency at 105 is diminished by destructive interference while the frequency at 104 is maintained by constructive interference. The level of constructive interference between frequency 105 and frequency 104 accordingly changes monotonically.

Figure 12:
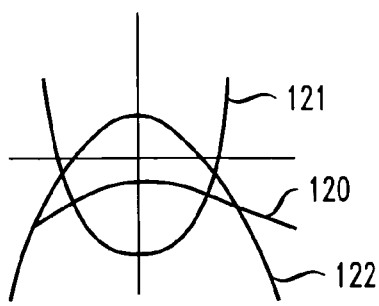

It is possible to remove chirp by modifying the effect of one or both paths. For example, as shown in FIG. 12, if the signal has a phase versus frequency dependency as shown at 120 and the effect of one waveguide is represented by the curve at 121, a curve having the shape as shown at 122 is advantageous. In particular, the sum of the signal phase versus frequency dependency and the second wavepath phase versus frequency dependency yields a composite effect that is in a similar relation to dependency 121 and geometrically inverted.

Figure 1:
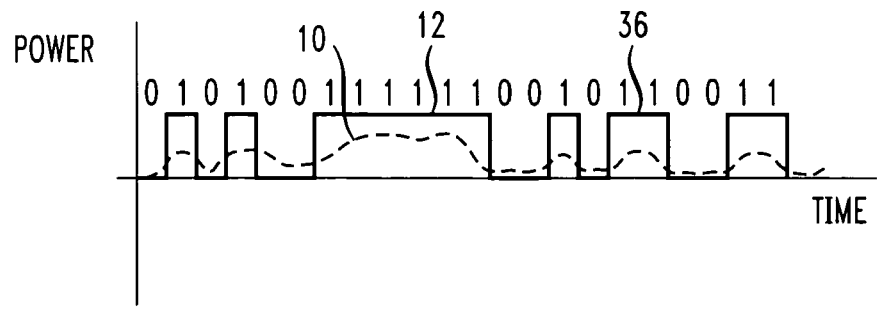
FIGS. 1 through 3 illustrate concepts involved in the processing of optical signal.
Figure 2:
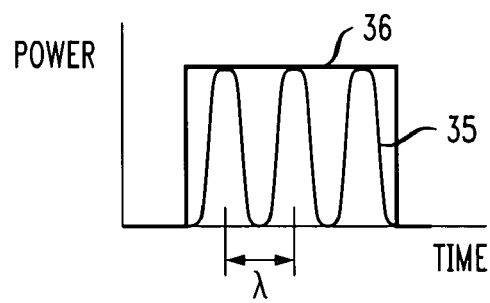
Figure 3:
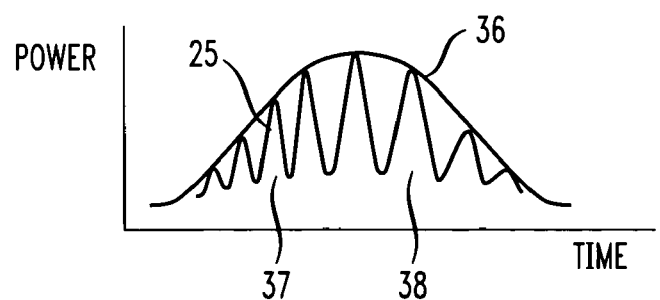
Figure 4:
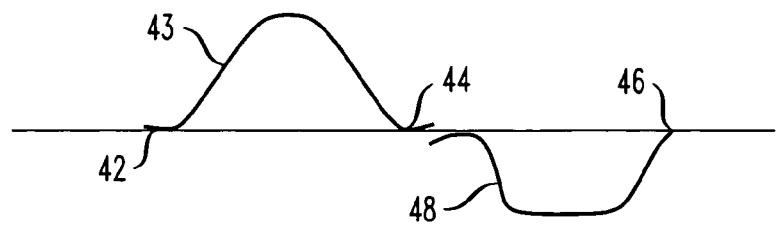
FIGS. 4 through 6 are illustrative of two-stage devices employed for signal equalization.
Figure 5:
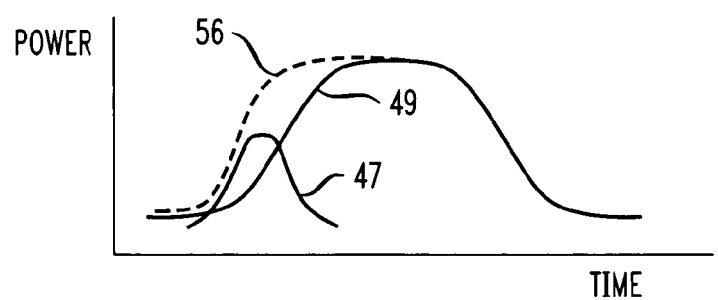
Figure 6:
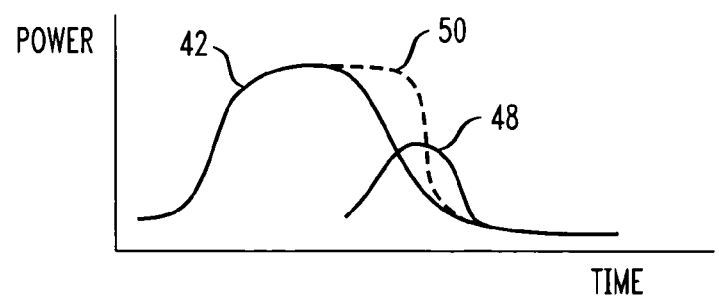
Figure 7:
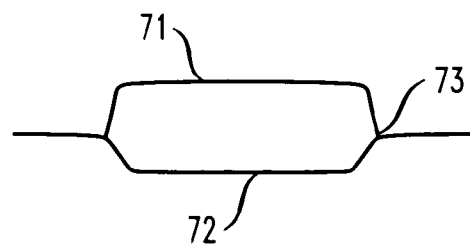
FIG. 7 is illustrative of an MZI device.
Figure 8:
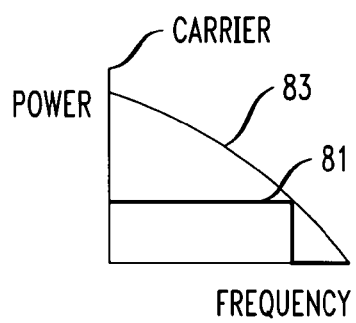
FIGS. 8 through 14 demonstrate concepts involved in equalization using nonlinear frequency-versus-phase change expedients.
Figure 9:
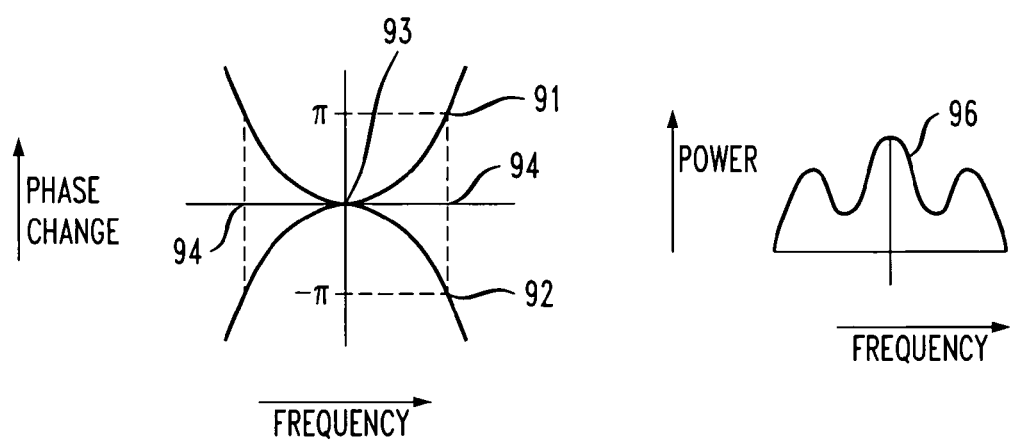

To produce equalization, the signal entering the equalizer is divided so that a portion traverses wavepath 71 in FIG. 7 and the second portion traverses wavepath 72. To avoid complications associated with determining the appropriate frequency-versus-phase dependency for each wavepath and to limit the optical loss in the equalizer, it is typically preferable for each portion to be approximately equal, i.e. the power in the first portion should be within 35 percent of that in the second portion. The division of the signal into such portions is achievable using conventional techniques such as y-splitters, directional couplers, and multi mode interference couplers. Similarly, the two portions are combined at 73 in FIG. 7. Such combination is also attainable using conventional techniques such as y-splitters, directional couplers, and multi mode interference couplers. The desired phase change versus frequency effects of the waveguides are produced by techniques such as AllPass filters, thin film etalons, and Bragg fiber gratings. As discussed in "Optical Filter Design and Analysis," Christi K. Madsen and Jian H. Zhao, Wiley and Sons, Inc., such expedients allow the tuning of the phase change versus frequency dependency and thus produces desirable flexibility in adjusting the device to provide acceptable equalization for a variety of signal characteristics.

Although the specific design of the device is not essential provided the previously discussed properties are employed, in one embodiment a MZI is used. In one advantageous embodiment each pathway (arm) of the MZI has at least one resonant ring. (A resonant ring is a wavepath that is coupled to an arm of an MZI as discussed in "Optical Filter Design and Analysis," Christi K. Madsen and Jian H. Zhao, Wiley and Sons, 1999). The delay introduced in the ring produces a cyclic response in the signal. If the cycle separation (controlled by suitable choice of ring) approximates the channel separation of the bands of a multichannel signal, it is possible to produce equalization for each channel of the signal with one MZI device. Generally, the size of such device is relatively small and thus it is possible to implement the invention as a relatively compact component. The fabrication of MZI devices is conventional and is described in texts such as Optical Fiber Telecommunications IIIB, edited by I. Kaminow and T. Koch, Academic Press, New York, 1997, pages 345 to 351, and 388–404.

We claim:

1. A method for processing a signal that is transmitted over an optical wavelength range encompassed by a channel of an optical communications system, said method comprising the steps of 1) coupling a first and second portion of said signal into a device wherein said first portion traverses a first optical wavepath of said device and said second portion traverses a second wavepath of said device, and 2) combining said first portion and second portion after said traversing of said first and second wavepath respectively characterized in that a first frequency-versus-phase dependency is imposed on said first portion by said first wavepath and a second frequency-versus-phase dependency is imposed on said second portion by said second wavepath such that said dependencies induce a signal group delay on said signal portions having a magnitude exceeding 200 $BR^{-2}$ ps/GHz for at least one wavelength within said channel of said signal where BR is the signal bit rate divided by $10^9$ symbols/sec and wherein said first frequency-versus-phase dependency and said second frequency-versus-phase dependency are similar to and inverted from each other.

2. The method of claim 1 wherein said first frequency-versus-phase dependency has a flat region within (0.5 GHz)×BR of the center frequency of said signal.

3. The method of claim 1 wherein said device comprises a Mach-Zehnder interferometer.

4. The method of claim 1 wherein said processing comprises improving the signal-to-noise ratio of said signal by at least 1 dB.

5. The method of claim 4 wherein said processing comprises improving the signal-to-noise ratio of said signal by at least 3 dB.

6. The method of claim 1 wherein said frequency-versus-phase dependencies are produced using ring resonators.

7. The method of claim 1 wherein the power in said first portion is within 35 percent of the power in said second portion.

8. An equalizer comprising an input optical wavepath, a first coupler between a first and second wavepath, said first coupler configured to divide an input signal into a first portion traversing said first wavepath and a second portion traversing said second wavepath and a second coupler configured to couple said first portion and said second portion after said first portion traverses said first wavepath and said second portion traverses said second wavepath wherein said signal encompasses a wavelength range of a communication channel characterized in that said first wavepath is configured to impose a first frequency-versus-phase dependency on said first portion and said second wavepath is configured to impose a second frequency-versus-phase dependency on said second portion such that said first and second dependencies induce on said signal portions a signal group delay exceeding 200 $BR^{-2}$ ps/GHz for at least one wavelength within said channel wherein BR is the bit rate of said signal divided by $10^9$ symbols/sec and wherein said first frequency-versus-phase dependency and said second frequency-versus-phase dependency are similar to and inverted from each other.

9. The device of claim 8 wherein said device comprises a Mach-Zehnder interferometer.

10. The device of claim 8 wherein said first and second wavepath include a ring resonator.

11. The device of claim 8 wherein said first coupler divides said signal such that the power in said first portion is within 35 percent of the power of said second portion.

* * * * *